United States Patent
Wang et al.

(10) Patent No.: US 10,074,143 B2
(45) Date of Patent: *Sep. 11, 2018

(54) SURFACING AN ENTITY'S PHYSICAL LOCATIONS VIA SOCIAL GRAPH

(71) Applicant: Microsoft Technology Licensing, LLC, Redmond, WA (US)

(72) Inventors: Ke Wang, Cupertino, CA (US); Songtao Guo, Cupertino, CA (US); Baoshi Yan, Belmont, CA (US); Alex Ching Lai, Menlo Park, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/473,988

(22) Filed: Aug. 29, 2014

(65) Prior Publication Data
US 2016/0065429 A1 Mar. 3, 2016

(51) Int. Cl.
*G06F 15/173* (2006.01)
*G06Q 50/00* (2012.01)
(Continued)

(52) U.S. Cl.
CPC .......... *G06Q 50/01* (2013.01); *H04L 67/18* (2013.01); *H04L 67/306* (2013.01); *G01S 5/02* (2013.01)

(58) Field of Classification Search
CPC ........ H04L 43/065; H04L 67/18; G06Q 50/01
See application file for complete search history.

(56) References Cited

U.S. PATENT DOCUMENTS 7,499,939 B2   3/2009   Jandhyala et al.
8,108,414 B2   1/2012   Stackpole
(Continued)

FOREIGN PATENT DOCUMENTS

CN    105279597 A    1/2016
WO    WO-201217813 A3    12/2012
(Continued)

OTHER PUBLICATIONS

Dodaro (Dodaro, Melonie, NPL, 9 steps to getting started with the new linkedin contacts, Jun. 26, 2013, Top Dog Social Media, retrieved from http://topdogsocialmedia.com/how-to-use-linkedin-contacts/ on May 9, 2016, NPL printed using web.archive screen capture dated Jul. 22, 2013; hereinafter Dod).*

(Continued)

*Primary Examiner* — Michael A Keller
(74) *Attorney, Agent, or Firm* — Schwegman Lundberg & Woessner, P.A.

(57) ABSTRACT

Techniques for determining a location of an entity are described. A determination module using member profile data may determine the location of the entity. Member profile data can include information about a member's employer and the employer's location. The determination module accesses member profiles from a social network. Additionally, the determination module may create a subgroup of entity-related member profiles from the accessed member profiles. The entity-related member profiles can be associated with a specific entity. Furthermore, the determination module may determine a suggested location for the specific entity based on location information derived from the related member profiles. Moreover, the determination module may calculate a connection density for the specific entity based on connections associated with the entity-related member profiles. Subsequently, the determination (Continued)

module may determine that the suggested location is a physical location when the calculated connection density is above a pre-determined threshold value.

18 Claims, 5 Drawing Sheets

(51) Int. Cl.
*H04L 29/08* (2006.01)
*G01S 5/02* (2010.01)

(56) References Cited

U.S. PATENT DOCUMENTS

| | | |
|---|---|---|
| 8,606,787 B1 | 12/2013 | Asgekar |
| 9,578,094 B1 | 2/2017 | Ranade |
| 9,811,866 B1 | 11/2017 | Goldman et al. |
| 2004/0122803 A1 | 6/2004 | Dom et al. |
| 2005/0137899 A1 | 6/2005 | Davies et al. |
| 2006/0106638 A1 | 5/2006 | Brown et al. |
| 2006/0194186 A1 | 8/2006 | Nanda |
| 2007/0071146 A1 | 3/2007 | Scaglione et al. |
| 2008/0082786 A1* | 4/2008 | Lovell .............. G06F 15/76 712/15 |
| 2009/0132345 A1 | 5/2009 | Meyssami et al. |
| 2011/0093420 A1 | 4/2011 | Rothenberg et al. |
| 2011/0161260 A1* | 6/2011 | Burges ............ G06F 17/30887 706/12 |
| 2011/0258049 A1 | 10/2011 | Ramer et al. |
| 2012/0150888 A1 | 6/2012 | Hyatt et al. |
| 2012/0254184 A1 | 10/2012 | Choudhary et al. |
| 2012/0259851 A1 | 10/2012 | Jia et al. |
| 2012/0290399 A1 | 11/2012 | England et al. |
| 2012/0296780 A1 | 11/2012 | McEntire |
| 2012/0316962 A1 | 12/2012 | Rathod |
| 2013/0117253 A1 | 5/2013 | Wang et al. |
| 2013/0185218 A1 | 7/2013 | Hermsdorff et al. |
| 2013/0191299 A1 | 7/2013 | Hermsdorff et al. |
| 2013/0318180 A1 | 11/2013 | Amin et al. |
| 2014/0075004 A1 | 3/2014 | Van Dusen et al. |
| 2014/0149244 A1 | 5/2014 | Abhyanker |
| 2014/0181194 A1 | 6/2014 | Sullivan |
| 2014/0195449 A1 | 7/2014 | Komissarchik et al. |
| 2014/0214960 A1 | 7/2014 | Allen et al. |
| 2014/0229407 A1 | 8/2014 | White |
| 2014/0230030 A1 | 8/2014 | Abhyanker |
| 2014/0236723 A1 | 8/2014 | Abhyanker |
| 2014/0244327 A1 | 8/2014 | Baldwin et al. |
| 2014/0244335 A1 | 8/2014 | Baldwin et al. |
| 2014/0280112 A1 | 9/2014 | Cheng et al. |
| 2014/0304254 A1 | 10/2014 | Rubinstein et al. |
| 2015/0127565 A1 | 5/2015 | Chevalier et al. |
| 2015/0332314 A1 | 11/2015 | Chakraborty et al. |
| 2015/0363827 A1* | 12/2015 | Tseng .............. G06Q 50/01 705/14.58 |
| 2015/0379113 A1 | 12/2015 | Wang et al. |
| 2015/0379445 A1 | 12/2015 | Wang et al. |
| 2015/0379535 A1 | 12/2015 | Wang et al. |
| 2016/0065628 A1 | 3/2016 | Guo et al. |

FOREIGN PATENT DOCUMENTS

| | | |
|---|---|---|
| WO | WO-2012178130 A2 | 12/2012 |
| WO | WO-2014074607 A2 | 5/2014 |
| WO | WO-2016003512 A1 | 1/2016 |

OTHER PUBLICATIONS

Samuelson (Samuelson, Maisy, Linkedin.com, Linkedin Official Blog, Now Companies too have profiles on LinkedIn!, Mar. 20, 2008, retrieved from https://blog.linkedin.com/2008/03/20/company-profile on May 10, 2016, NPL printed using web archive screen capture dated Jan. 11, 2012; hereinafter Sam).*

"International Application Serial No. PCT/US2015/023332, International Search Report dated Jul. 8, 2015", 2 pgs.

"International Application Serial No. PCT/US2015/023332, Written Opinion dated Jul. 8, 2015", 4 pgs.

"U.S. Appl. No. 14/474,009, Non Final Office Action dated May 18, 2016", 25 pgs.

"U.S. Appl. No. 14/474,009, Response filed Oct. 18, 2016 to Non Final Office Action dated May 18, 2016", 14 pgs.

"U.S. Appl. No. 14/587,047, Non Final Office Action dated Jul. 27, 2017", 24 pgs.

"U.S. Appl. No. 14/672,948, Response filed Jul. 27, 2017 to Non Final Office Action dated May 17, 2017", 14 pgs.

"U.S. Appl. No. 14/474,009, Examiner Interview Summary dated Oct. 24, 2016", 3 pgs.

"U.S. Appl. No. 14/474,009, Final Office Action dated Jan. 12, 2017", 24 pgs.

"International Application Serial No. PCT/US2015/023332, International Preliminary Report on Patentability dated Jan. 12, 2017", 6 pgs.

"U.S. Appl. No. 14/474,009, Response filed May 12, 2017 to Final Office Action dated Jan. 12, 2017", 16 pgs.

"U.S. Appl. No. 14/672,948, Non Final Office Action dated May 17, 2017", 12 pgs.

"U.S. Appl. No. 14/474,009, Examiner Interview Summary dated Mar. 7, 2018", 3 pgs.

"U.S. Appl. No. 14/474,009, Non Final Office Action dated Nov. 20, 2017", 8 pgs.

"U.S. Appl. No. 14/474,009, Response filed Mar. 8, 2018 to Non Final Office Action dated Nov. 20, 2017", 11 pgs.

"U.S. Appl. No. 14/587,047, Final Office Action dated Jan. 10, 2018", 36 pgs.

"U.S. Appl. No. 14/587,047, Response filed Nov. 27, 2017 to Non Final Office Action dated Jul. 27, 2017", 17 pgs.

"U.S. Appl. No. 14/672,948, Examiner Interview Summary dated Dec. 28, 2017", 3 pgs.

"U.S. Appl. No. 14/672,948, Final Office Action dated Nov. 1, 2017", 12 pgs.

"U.S. Appl. No. 14/672,948, Response filed Jan. 26, 2018 to Final Office Action dated Nov. 1, 2017", 14 pgs.

"U.S. Appl. No. 14/587,047, Response filed Apr. 11, 2018 to Final Office Action dated Jan. 10, 2018", 20 pgs.

"U.S. Appl. No. 14/474,009, Notice of Allowance dated May 7, 2018", 7 pgs.

U.S. Appl. No. 14/587,047, filed Dec. 31, 2014, Determining a Function of an Entity.

U.S. Appl. No. 14/474,009, filed Aug. 29, 2014, Calculating an Entity's Location Size Via Social Graph.

U.S. Appl. No. 14/672,948, filed Mar. 30, 2015, Determining an Entity's Hierarchical Relationship Via a Social Graph.

U.S. Appl. No. 14/672,833, filed Mar. 30, 2015, Determining a Relationship Type Between Disparate Entities.

"U.S. Appl. No. 14/672,833, Examiner Interview Summary dated Jun. 8, 2018", 4 pgs.

"U.S. Appl. No. 14/672,833, Non Final Office Action dated May 23, 2018", 17 pgs.

"U.S. Appl. No. 14/972,948, Non Final Office Action dated May 17, 2018", 15 pgs.

* cited by examiner

SURFACING AN ENTITY'S PHYSICAL LOCATIONS VIA SOCIAL GRAPH

TECHNICAL FIELD

The subject matter disclosed herein generally relates to the processing of data. Specifically, the present disclosure generally relates to techniques for determining an entity's physical locations via a social graph. For example, based on connections between members in a social network, techniques are described to determine the office locations of a company.

BACKGROUND

Social media and networking websites can maintain information on companies, organizations, employees, and employers. The information may involve firmographic information, such as information identifying a headquarters of a company, a hierarchical structure of a company or organization (such as identifying a subsidiary), and the like. Often, some useful firmographic information may be missing or otherwise unavailable.

BRIEF DESCRIPTION OF THE DRAWINGS

Some embodiments are illustrated by way of example and not limitation in the figures of the accompanying drawings.

DETAILED DESCRIPTION

Members of a social network can create member profiles and associate themselves with entities (e.g., member's employer). In addition to member profiles, a social network can have entity profiles (e.g., company page with information relating to an entity.

An entity profile can be created by members associated with the entity. The entity profile can be created by members that are authorized to create the entity profile. Known verification processes can be used to determine if a member is authorized to create the entity profile.

However, in some instances, a social network may have missing entity profiles. A missing entity profile can be a profile of an entity that has been identified in a member profile, but the entity profile has not been created in the social network. For example, a member profile can include the name of the member's employer, but the employer does not have an entity profile (e.g., company page) in the social network.

Additionally, demographic information about an entity such as, but not limited to, name of entity, address and website of the company, can be accessed in the public domain.

In contrast, firmographic information can be information that is not easily ascertained from the public domain, such has, but not limited to, age of company, size of company, ownership of company, partnership between different companies, geographic locations (e.g., distribution center, headquarters), market, position, stage, trends, customers, property, parent company, and subsidiaries of a company. For example, privately held companies or close corporations may not have publicly-released firmographic information. With regards to marketing or other purposes, firmographic information can be more valuable than demographic information.

Furthermore, firmographic information can be a set of characteristics associated with an entity. Firmographic information can be specialized to entities in a particular industry. Furthermore, firmographic information can allow for comparison of entities in similar industry.

Techniques described herein allow for the determination and creation of an entity profile having firmographic information (e.g., entity location based on member profile data. Member profile data can be information accessed from member profiles.

According to some embodiments, an entity profile can be created based on entity information. The entity information can be determined based on information accessed from member profiles. The entity information can include: entity name; entity locations; website associated with the entity; country associated with the entity; region associated with the entity; industry associated with the entity; zip code associated with the entity; and number of members.

For example, when the entity is a company, the company profile can include information relating to the company's name, the office locations of the company (e.g., country, region, city, state, zip code), the website of the company, the industry associated with the company, and the number of employees.

As previously mentioned, firmographic information can be determined through member profile data, which may include connections (e.g., first-degree, second-degree) between members.

Additionally, an entity profile can be generated, by the social network system, for a missing entity profile using member profile data. The member profile data in a social network can be aggregated to determine firmographic information in order to generate an entity profile.

Furthermore, the firmographic information can be used to verify information about an entity. For example, a company profile created by a member can disclose that the company has 10,000 employees. The firmographic information derived from member profile data can verify the company size listed on the company profile.

Example methods and systems are directed to techniques for determining firmographic information based on member profile data and social graph data. More specifically, the present disclosure relates to methods, systems and computer program products for surfacing an entity's physical locations via social graph. Techniques for using connection density with social graph data can be used to determine and verify physical location.

Examples merely demonstrate possible variations. Unless explicitly stated otherwise, components and functions are optional and may be combined or subdivided, and operations may vary in sequence or be combined or subdivided.

In the following description, for purposes of explanation, numerous specific details are set forth to provide a thorough understanding of example embodiments. It will be evident to one skilled in the art, however, that the present subject matter may be practiced without these specific details.

Figure 1:
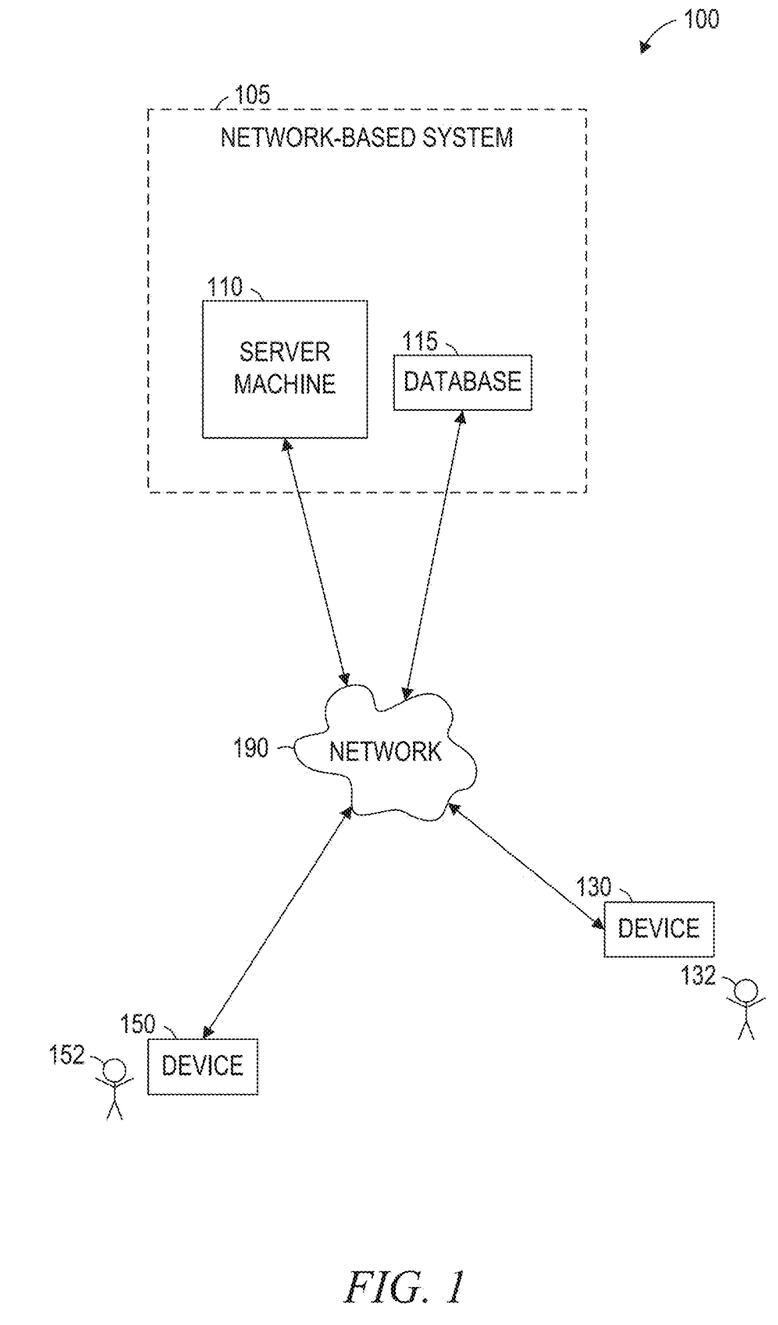
FIG. 1 is a network diagram illustrating a network environment suitable for a social network, according to some example embodiments.

FIG. 1 is a network diagram illustrating a network environment 100 suitable for social network service, according to some example embodiments. The network environment 100 includes a server machine 110, a database 115, a first device 130 for a first user 132, and a second device 150 for a second user 152, all communicatively coupled to each other via a network 190. The server machine 110 may form all or part of a network-based system 105 (e.g., a cloud-based server system configured to provide one or more services to the devices 130 and 150). The database 115 can store member data (e.g., profile data social graph data) for the social network service. The server machine 110, the first device 130 and the second device 150 may each be implemented in a computer system, in whole or in part, as described below with respect to FIG. 5.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
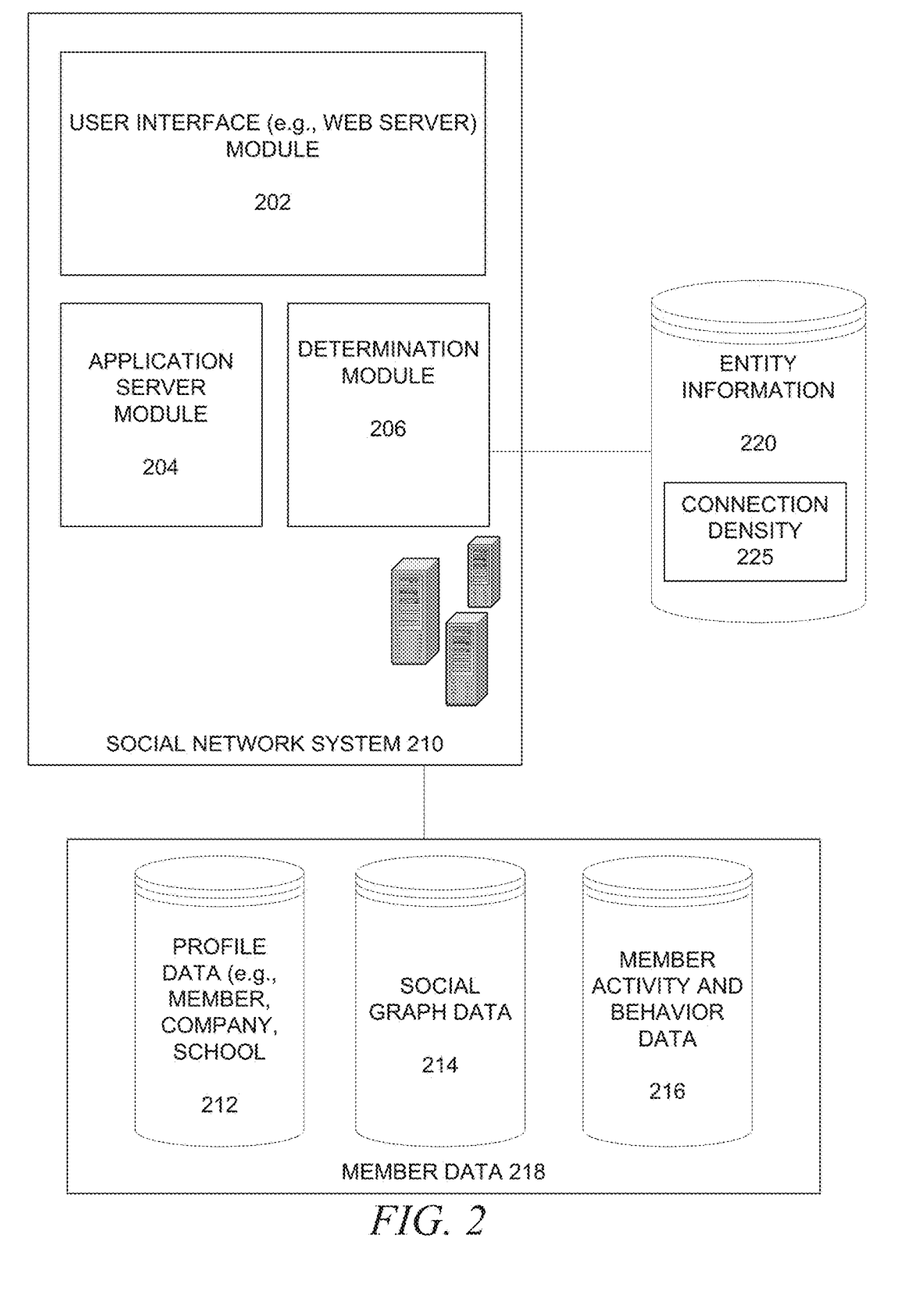
FIG. 2 is a block diagram illustrating various modules of a social network service, according to some embodiments.

FIG. 2 is a block diagram illustrating components of a social network system 210 according to some example embodiments. The social network system 210 is an example of a network-based system 105 of FIG. 1. The social network system 210 can include a user interface module 202, application server module 204, and determination module 206, all configured to communicate with each other (e.g., via a bus, shared memory, a switch.). Furthermore, the social network system 210 can communicate with database 115 of FIG. 1, such as a database storing member data 218. The member data 218 can include profile data 212, social graph data 214, and member activity and behavior data 216. Using member data 218, entity information 220 can be determined. Additionally, connection density 225 can be determined based on member data 218.

Figure 3:
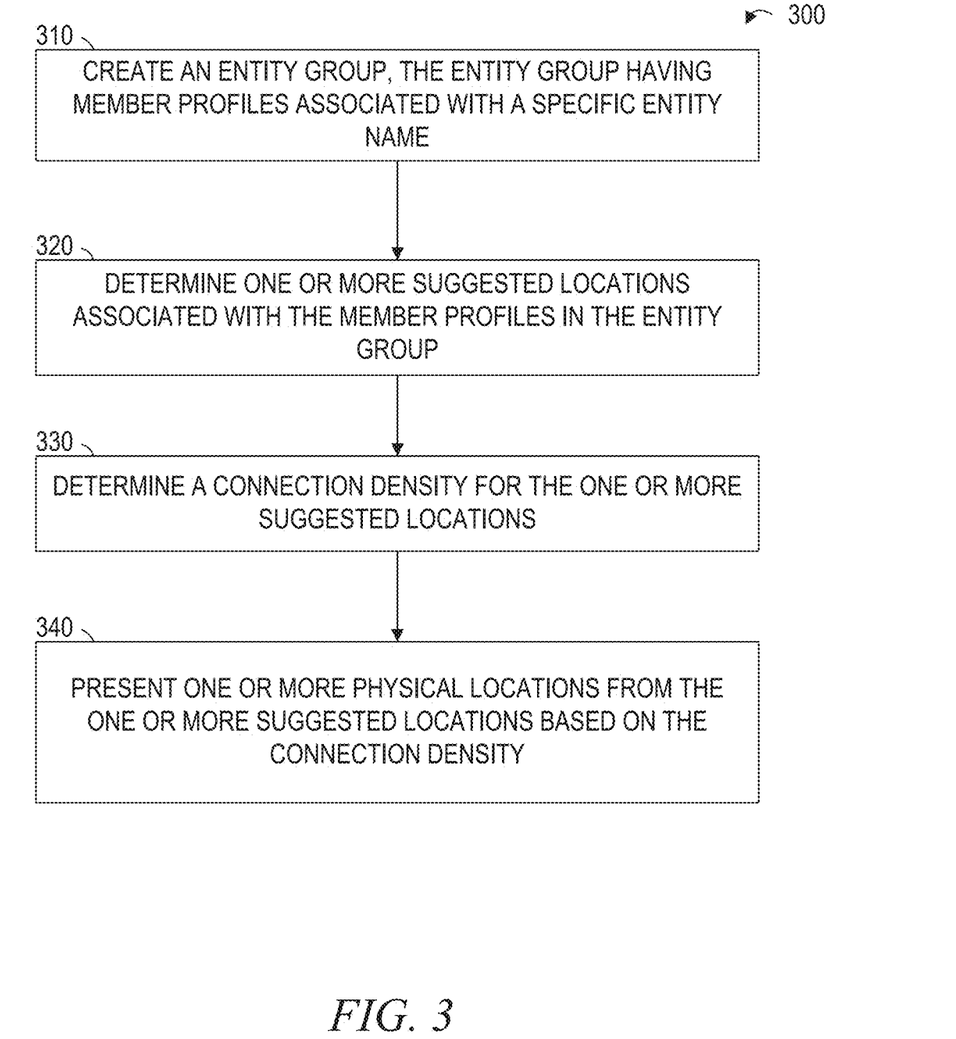
FIG. 3 is a flowchart illustrating a method for determining a location of an entity, according to some example embodiments.
Figure 4:
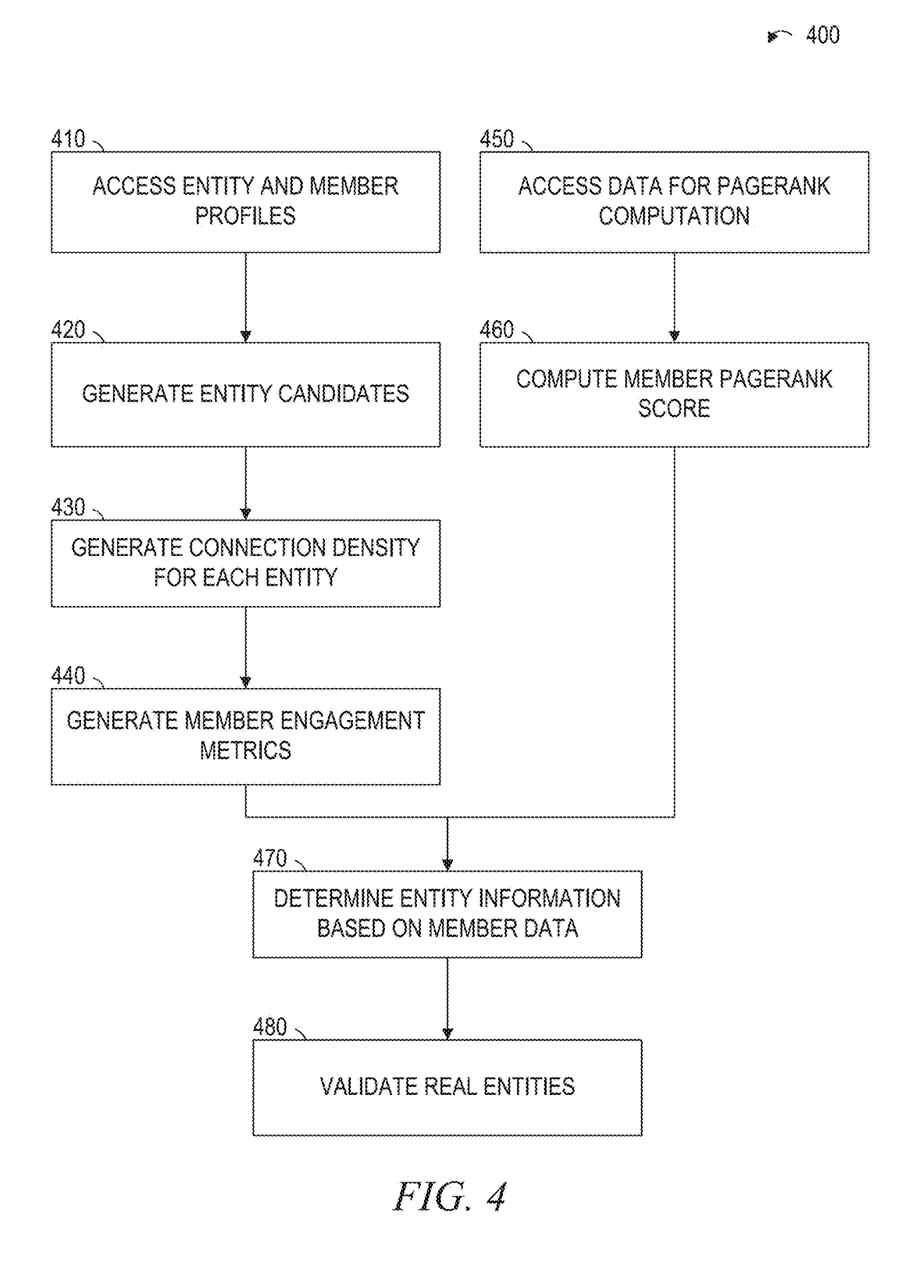
FIG. 4 is a flowchart illustrating a method for verifying a location of an entity, according to some example embodiments.

As will be further described in FIGS. 3-4, the determination module 206 in conjunction with the user interface module 202 and the application server module 204 can determine an entity information 220 (e.g., entity's physical location, connection density 225) using member data 218.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

As shown in FIG. 2, the data layer includes several databases, such as a database for member data 218 for storing profile data 212, including both member profile data as well as profile data for various organizations. Additionally, the database for member data 218 can store social graph data 214 and member activity and behavior data 216.

Profile data 212 can be used to determine entities (e.g., company, organization) associated with a member. For instance, with many social network services, when a user registers to become a member, the member is prompted to provide a variety of personal and employment information that may be displayed in a member's personal web page. Such information is commonly referred to as profile data 212. The profile data 212 that is commonly requested and displayed as part of a member's profile includes a person's age, birthdate, gender, interests, contact information, residential address, home town and/or state, the name of the person's spouse and/or family members, educational background (e.g., schools, majors, matriculation and/or graduation dates, etc.), employment history, skills, professional organizations, and so on. In some instances, profile data 212 can include company size, industry, function, seniority, skills, and geography.

With some embodiments, profile data 212 may include the various skills that each member has indicated he or she possesses. Additionally, profile data 212 may include skills for which a member has been endorsed in the profile data 212.

In some other embodiments, with certain social network services, such as some business or professional network services, profile data 212 may include information commonly included in a professional resume or curriculum vitae, such as information about a person's education, the company at which a person is employed, an industry in which a person is employed, a job title or function, an employment history, skills possessed by a person, professional organizations of which a person is a member, and so on.

In some embodiments, profile data 212 can include data associated with an entity page (e.g., company page). For example, when a representative of an organization initially registers the organization with the social network service, the representative may be prompted to provide certain information about the organization. This information may be stored, for example, in the database 115.

With some embodiments the profile data 212 may be processed (e.g., in the background or offline) to determine entity information 220. Entity information 220 can include a physical location of entity and connection density 225. For example, if a member has provided information about various job the member has held with the same or different companies, and the physical location, this information can be used to derive entity information 220.

Additionally, social network services provide their users with a mechanism for defining their relationships with other people. This digital representation of real-world relationships is frequently referred to as a social graph data 214. As it will be later described, social graph data 214 can be used to determine connection density 225.

In some instances, social graph data 214 can be based on an organization's presence within the social network service. For example, consistent with some embodiments, a social graph is implemented with a specialized graph data structure in which various entities (e.g., companies, schools, government institutions, non-profits, and other organizations) are represented as nodes connected by edges, where the edges have different types representing the various associations and/or relationships between the different entities.

Furthermore, the social graph data 214 can be maintained by a third-party social network service. For example, users can indicate a relationship or association with a variety of real-world entities and/or objects. Typically, a user input is captured when a user interacts with a particular graphical user interface element, such as a button, which is generally presented in connection with the particular entity or object and frequently labeled in some meaningful way (e.g., "like," "+1," "follow").

Once registered, a member may invite other members, or be invited by other members, to connect via the social network service. A "connection" may have a bi-lateral agreement by the members, such that both members acknowledge the establishment of the connection. According to some embodiments, connection relationship data can be stored in the social graph data 214.

Similarly, with some embodiments, a member may elect to "follow" another member. In contrast to establishing a connection, the concept of "following" another member typically is a unilateral operation, and at least with some embodiments, does not require acknowledgement or approval by the member being followed. When one member follows another, the member who is following may receive status updates or other messages published by the member being followed, or relating to various activities undertaken by the member being followed. According to some embodiments, follow data can be stored in the social graph data 214.

In any case, the various associations and relationships that the members establish with other members, or with other entities and objects, are stored and maintained within the social graph data 214.

In some instances, the social graph data 214 can be used by the determination module 206 to determine the connection density 225. The connection density 225 can be part of the entity information 220.

The connection density 225 can be another factor in determining the physical locations of an entity. For members belonging to the same entity, the determination module 206 can determine how densely a member is connected to another member. The connection density 225 can be calculated for all the member profiles associated with the entity, or for a subgroup of the member profiles associated with the entity. Subgroups can be based on suggested locations, entity functions, years of experience of a member, or a title (e.g., director, vice-president) of a member. Entity functions can include member profiles associated with a specific function (e.g., human resource department, research and development, leadership team) within the entity.

By having a minimum threshold for the connection density 225, the determination module 206 can more accurately determine physical locations associated with the entity. When the minimum threshold is surpassed, the determination module 206 can present a confidence score based on the entity information 220. Alternatively, the determination module 206 can present a binary result (e.g., Yes, No) based on the entity information 220.

For example, when an employer has n=10 employees, there are 45 ($45=\Sigma_{k=1}^{n}=9+8+7+6+5+4+3+2+1$) unique first-degree connections. Therefore, when the minimum threshold for the connection density 225 is preset at 20%, then there should be at least 9 connections (9=45*20%) for the determination module 206 to determine with a high-confidence level (e.g., 95% confidence level) that the location associated with the members is a physical location.

Using connection density 225, the determination module 206 may locate physical offices associated with a company without manual human labor, such as analyzing filing at a city's secretary of commerce office to determine if a company has opened a new office.

Additionally, the connection density 225 can be dependent on the number of employees. In some instances, a higher connection density 225 may be used for a smaller company, while a lower connection density 225 can be used for a larger company. For example, it is less likely that an employee knows each and every employee when the employer is a large company (e.g., 10,000+). Therefore, in one example, the minimum connection density threshold for a large company can be preset at 5%.

Furthermore, the connection density 225 can be calculated for the whole entity, or for each suggested location based on the member profiles. The connection density 225 can verify with high certainty that a suggested location is an actual physical location.

Alternatively, if the connection density 225 is below the minimum threshold, then the determination module 206 cannot determine the physical location with a high-confidence level. This may occur when a company might hire satellite employees working at different locations (e.g., working at home). Accordingly, when the minimum connection density threshold is not met, the determination module 206 may infer that the employees at the suggested location do not know each other, and the suggested location is not a physical office location for the company.

In some instances, location information can be stored over a period of time in a historical location system. The historical location system can store the suggested locations and physical locations. The social network system 210 can use the historical location system to present how an entity is growing in members and in locations. For example, the social network system 210 can present a timeline of the growth of a company based on office development.

Additionally, determination module 206 can verify the entity information 220 based on other received information by a member. Other received information by a member can include the Internet Protocol (IP) address of where the member is logging in from. For example, the IP address can be looked up to verify that a member is actually logging in from or near the location listed on the profile of the member in the social network system 210.

Referring back to FIG. 2, in addition to hosting a vast amount of social graph data 214, many social network services maintain member activity and behavior data 216.

The social network service may provide a broad range of other applications and services that allow members the opportunity to share and receive information, often customized to the interests of the member. With some embodiments, members may be able to self-organize into groups, or interest groups, around a subject matter or topic of interest. With some embodiments, the social network service may host various job listings providing details of job openings with various organizations.

Furthermore, as members interact with the various applications, services and content made available via the social network service, the members' behavior (e.g., check-in at a location, content viewed, links selected, etc.) may be used to determine a location specific to the user. In some embodiments, location information can be based on the member activity and behavior data 216.

Online or web-based social network services can use member data (e.g., profile data 212, social graph data 214, member activity and behavior data 216) to determine entity information 220 such as entity location information. Additionally, member data 218 can be used to determine a connection density 225 associated with a member. Accordingly, embodiments of the present invention can provide an entity's physical locations based on entity information 220 and connection density 225.

FIG. 3 is a flowchart illustrating operations of the determination module 206 in performing a method 300 for determining entity location information, according to some example embodiments. Operations in the method 300 may be performed by network-based system 105, using modules described above with respect to FIG. 2. As shown in FIG. 3, the method 300 includes operations 310, 320, 330, and 340.

At operation 310, the determination module 206 can create an entity group. The entity group contains member profiles associated with a specific entity name. For example, the determination module 206 can group all member profiles that list Employer A as their employer. These member profiles can be included in an entity group for Employer A. The determination module 206 can access profile data 212 to determine the employer of a member.

In some embodiments, the entity group can include member profiles that are associated with the specific entity. For example, the group for Employer A can include member profiles associated with subsidiaries of Employer A and a parent company of Employer A.

Additionally, an entity may be labeled differently among various member profiles. For example, a first member profile may have the full legal name of the specific entity, while a second member profile may only have the acronym associated with the specific entity. According to some embodiments, when the determination module 206 determines that a specific entity has different labels, the determination module 206 can include all member profiles associated with the specific entity, regardless of the different labeling.

At operation 320, the determination module 206 can determine one or more locations associated with the member profiles in the entity group. The determination module 206 can access the profile data 212 to determine the location associated with each member profile. Continuing with the example from operation 310, the determination module 206 can determine that San Francisco and New York are the locations associated with the member profiles in the group for Employer A. The location can be based on the location associated with a member or the location associated with the member's employer.

The location can include country, state, city, region, zip code, street address. Additionally, the location can be based on other factors, such as a member's IP address or location determination of a member's mobile device. The location determination of a member's mobile device can be based on Global Positioning System (GPS) technology or indoor position system (IPS) location determination technologies (e.g., Bluetooth).

At operation 330, the determination module 206 can determine the connection density 225 for the one or more locations determined at operation 320. For example, the member profiles that list Employer A as their employer can include a percentage of members at a first location. The members at the first location can be a first subset of the member profiles that list Employer A as their employer. The determination module 206 can determine the connection density 225 for the first location. Additionally, the determination module 206 can determine the connection density 225 for all the member profiles associated with the entity group.

In some instances, the members of the group may be well connected if for example, a connection density 225 ratio is above a threshold value. The determination module 206 can determine the connection density 225 ratio based on the member data 218.

As previously discussed in FIG. 2, the determination module 206 can determine a connection density 225 by identifying a set of connection paths connecting a plurality of member profiles. Additionally, a path score for each connection path identified may be generated. For example, the path score for each individual connection path may be dependent upon individual edge scores (e.g., based on $1^{st}$ degree or $2^{nd}$ degree connection) assigned to the edges connecting the nodes (e.g., member profile) in the connection path. Different algorithms may be used to derive path scores for different applications or tasks. The particular algorithm used to derive the path score may be dynamically selected, for example, based on a determination of what the system or user is attempting to achieve. Consequently, the edge scores or weights for different edge types may be derived differently, for example, to increase or decrease the influence of edge scores of certain types of edges on the path score, depending upon the particular application that has been invoked, or a particular task or process being performed.

In one example embodiment, only bi-bilateral relationships (e.g., relationships that have been acknowledged by both people in the relationship) are considered for determining the connection density 225 and the path score. In another example embodiment, relationships acknowledged by only one member in the relationship or relationships that have not been acknowledged by members in the relationship are considered.

A connection density ratio for a selected person may be defined, for example, as the actual number of connections of the selected member to other members of the group divided by the potential number of connections for the selected person. The number of connections can be based on first-degree connections, second-degree connections and so on. First-degree connections can be direct bi-lateral connections between two members. When Members A and B have a first-degree connection, and Members B and C has a first-degree connection, then the connection between member A and C is an example of a second-degree connection.

In one example embodiment, all members who have specified in their respective member profiles that they are current employees of a particular company are identified, and an estimate of the number of employees for the company is determined. The potential number of unique connections between each pair of people in the company may be determined based on the estimated number of employees. Additionally, the potential number of unique connections can be used in determining a connection density ratio for each employee or for each location. Furthermore, an average connection density ratio of all employees in the company may be computed as a baseline connection density ratio for all employees of the company.

Now referring back to method 300, at operation 340, the determination module 206 can present one or more physical locations from the one or more suggested locations based on the connection density 225 for each suggested location. For example, the determination module 206 can present a physical location based on the suggested location when the calculated connection density 225 is above a pre-determined threshold.

In some instances, the physical location can be determined based on a threshold percentage ratio of member profiles being associated with a specific location. To illustrate, the determination module 206 can calculate that 10% of the member profiles associated with Employer A are located in city A, which may suffice in determining that Employer A has a physical office location in city A.

Additionally, a physical location can be further determined based on the connection density ratio of the member profiles associated with the specific location. For example, based on the connection density 225 of the member profiles located in city A being higher than a pre-determined threshold, the determination module 206 can determine with an higher confidence level that city A is a physical location (e.g., office location) for Employer A.

Furthermore, the pre-determined threshold can be dependent on location, number of employees, industry or other historical data available to the social network system 210. For example, the social network system 210 can have a penetration rate (e.g., % of country's population on the social network system 210) of members at country A. Therefore, based on the historical data (e.g., penetration rate) and the location of the suggested office, the determination module 206 can set the threshold value for the connection density ratio. Using machine-learning techniques, the threshold value can be dynamically set as the data associated with the social network system 210 is updated.

Accordingly, when the connection density ratio is higher than a pre-determined threshold value, the determination module 206 can infer that the members located at city A are well connected. As a result, the determination module 206 can determine with a high confidence level (e.g., 95% confidence level) that city A is an actual office location for Employer A.

Moreover, based on the connection density 225 of a particular subgroup, additional information can be inferred. For example, when the connection density 225 associated with the executives of an entity at a particular location is high, the determination module 206 can determine that particular location to be the entity's headquarters.

FIG. 4 is a flowchart illustrating operations of the determination module 206 in performing a method 400 for detecting whether a given company is valid based on profiles of its associated members, in accordance with another embodiment of the present invention. Operations in the method 400 may be performed by network-based system 105, using modules described above with respect to FIG. 2. As shown in FIG. 4, the method 400 includes operations 410, 420, 430, 440, 450, 460, 470 and 480.

At operation 410, the determination module 206 can access entity and member profiles from member data 218. The user interface module 202, application server module 204, and determination module 206 in the social network system 210 are configured to communicate with each other (e.g., via a bus, shared memory, a switch). Furthermore, the social network system 210 can communicate with database 115 of FIG. 1, such as a database storing member data 218. The member data 218 can include profile data 212, social graph data 214, and member activity and behavior data 216

At operation 420, the determination module 206 can generate a list of candidate entities based on the accessed information from operation 410. The generated list of candidate entities can be stored as entity information 220. Candidate entities can include missing entity profiles. As previously mentioned, a missing entity profile can be a profile of an entity that has been identified in a member profile, but the entity profile has not been created in the social network. For example, a member profile can include the name of the member's employer, but the employer does not have an entity profile (e.g., company page) in the social network.

At operation 430, the determination module 206 can calculate connection densities for each entity in the generated list of candidate entities. The connection density can be calculated as described in FIGS. 2-3. For example, the determination module 206 can infer that when members in a given entity are tightly connected to each other, the entity has a higher probability of existing. The connection between members can be measured using the connection density 225.

At operation 440, the determination module 206 can generate member engagement metrics. Member engagement metrics can be generated based on accessed entity metrics data. For example, when members of a given entity are very actively on a social network system 210, the entity has a higher probability of existing. The activity of a member is measured using member engagement metrics based on user engagement and usage.

Separately, at operation 450, the determination module 206 can access pagerank data for pagerank computations. At operation 460, the determination module 206 can compute members' pagerank scores based on the accessed pagerank data from operation 450. For example, when members in a given entity are highly influential in the social graph, the given entity is more likely to exist. The social graph can be accessed from the social graph data 214, and measured by the pagerank score of members.

The computed pagerank score for members from operation 460 and the generated member engagement metrics from operation 440 can be stored as member data 218.

At operation 470, the determination module 206 can determine entity information 220 based on the member data 218 (e.g., computed pagerank score, member engagement metrics).

At operation 480, the determination module 206 can validate entities as being real based on the entity information. Furthermore, after the validity of a company has been made, the determination module 206 can use member data 218 to infer more entity information 220 (e.g., company attributes).

Company attributes can include: the company locations based on member locations; company uniform resource locator (URL) based on company email domain; industry based on the industry specified in the member profiles; and size based on the number of members as well as the penetration rate of the social network system 210. The penetration rate can further dependent on the location (e.g., region) and the industry.

According to some embodiments, a threshold-based approach (e.g., pre-determined minimum threshold value) as illustrated in FIGS. 3-4 can be used to determine if an entity exists. Alternatively, a machine-learning based solution can be used to dynamically determine if an entity exists. The machine-learning can be based on training data, which can be labeled automatically by the determination module 206.

According to various example embodiments, one or more of the methodologies described herein may facilitate the determination of actual office location for a company.

When these effects are considered in aggregate, one or more of the methodologies described herein may obviate a need for certain human efforts or resources that otherwise would be involved in determining entity locations. Additionally, computing resources used by one or more machines, databases, or devices (e.g., within the network environment 100) may similarly be reduced. Examples of such computing resources include processor cycles, network traffic, memory usage, data storage capacity, power consumption, and cooling capacity.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 5:
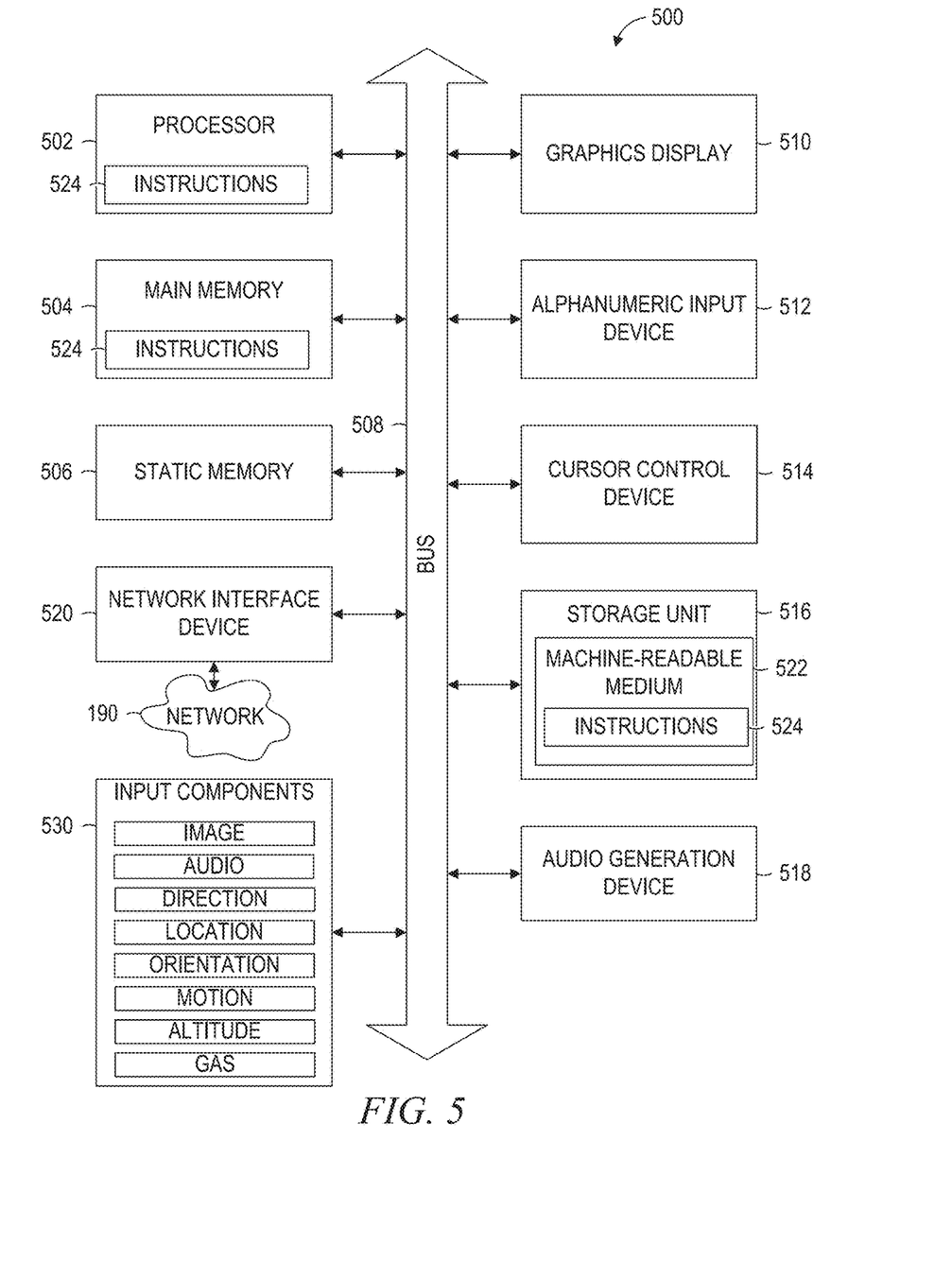
FIG. 5 is a block diagram illustrating components of a machine, according to some example embodiments, able to read instructions from a machine-readable medium and perform any one or more of the methodologies discussed herein.

FIG. 5 is a block diagram illustrating components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer system (e.g., a computer) within which the instructions 524 (e.g., software, a program, an application, an applet, an app, or other executable code) for causing the machine 500 to perform any one or more of the methodologies discussed herein may be executed, in whole or in part.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a distributed (e.g., peer-to-peer) network environment. The machine 500 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include any collection of machines that individually or jointly execute the instructions 524 to perform all or part of any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a cursor control device 514 (e.g., a mouse, a touchpad, a trackball, a joystick, a motion sensor, an eye tracking device, or other pointing instrument), a storage unit 516, an audio generation device 518 (e.g., a sound card, an amplifier, a speaker, a headphone jack, or any suitable combination thereof), and a network interface device 520.

The storage unit 516 includes the machine-readable medium 522 (e.g., a tangible and non-transitory machine-readable storage medium) on which are stored the instructions 524 embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered machine-readable media e.g., tangible and non-transitory machine-readable media). The instructions 524 may be transmitted or received over the network 190 via the network interface device 520. For example, the network interface device 520 may communicate the instructions 524 using any one or more transfer protocols (e.g., HTTP).

In some example embodiments, the machine 500 may be a portable computing device, such as a smart phone or tablet computer, and have one or more additional input components 530 (e.g., sensors or gauges). Examples of such input components 530 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 530 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, using a network interface device, member profiles from a social network, the member profiles being associated with a plurality of entities, wherein each member profile is associated with a unique user;
   creating a subgroup of entity-related member profiles from the accessed member profiles, each of the entity-related member profiles being associated with a specific entity from the plurality of entities;
   determining, using a processor, a potential physical location of the specific entity based on location information derived from the entity-related member profiles, the location information indicating a geographic location where users associated with the entity-related member profiles currently reside;
   determining an estimated total number of unique users associated with the entity;
   determining, based on the estimated total number of unique users, a potential number of unique connections;
   calculating, based on entity data describing connections between the entity-related member profiles, an actual number of unique connections between the entity-related member profiles;
   dividing the potential number of unique connections by the actual number of unique connection values, yielding a connection density value;
   determining that the potential physical location is an actual physical location when the connection density value meets or exceeds a pre-determined threshold connection density value;
   calculating a member pagerank score for the entity-related member profiles, the member pagerank score corresponding to a probability that a person accesses the entity-related member profiles; and
   determining that the specific entity is a genuine entity based on the member pagerank score.

2. The method of claim 1, further comprising:
   generating an entity profile for the specific entity based on entity information derived from the related member profiles, the entity profile including the actual physical location.

3. The method of claim 1, further comprising:
   creating a subgroup of location-related member profiles from the entity-related member profiles, the location-related member profiles being associated with the specific entity and the potential physical location; and
   calculating a second connection density value based on connections associated with the location-related member profiles, wherein the determination of the actual physical location is further based on the second connection density value.

4. The method of claim 3, wherein the potential physical location is determined to be an actual physical location when the second connection density meets or exceeds a second pre-determined threshold value.

5. The method of claim 1, further comprising:
   generating a member engagement metric for the entity-related member profiles, the member engagement metric corresponding to an amount of usage of the social network by the entity-related member profiles; and
   determining that the specific entity is a genuine entity based on the member engagement metric.

6. The method of claim 1, wherein the pre-determined threshold value is based on an industry associated with the specific entity.

7. The method of claim 1, wherein the pre-determined threshold value is based on the potential physical location.

8. The method of claim 1, wherein the pre-determined threshold value is based on a penetration rate for the potential physical location.

9. The method of claim 1, wherein the potential physical location is a zip code, a city, a region, or a country.

10. A system comprising:
a member database storing member profiles of members of a social network, the member profiles being associated with a plurality of entities, wherein each member profile is associated with a unique user;
a network interface device configured to:
access, from the member database, the member profiles; and
a determination module, including one or more processors, configured to:
create a subgroup of entity-related member profiles from the accessed member profiles, each of the entity-related member profiles being associated with a specific entity from the plurality of entities;
determine a potential physical location of the specific entity based on location information derived from the entity-related member profiles, the location information indicating a geographic location where users associated with the entity-related member profiles currently reside;
determine an estimated total number of unique users associated with the entity;
determine, based on the estimated total number of unique users, a potential number of unique connections;
calculate, based on entity data describing connections between the entity-related member profiles, an actual number of unique connections between the entity-related member profiles;
divide the potential number of unique connections by the actual number of unique connection values, yielding a connection density value;
determine that the potential physical location is an actual physical location when the connection density value meets or exceeds a predetermined threshold connection density value;
calculate a member pagerank score for the entity-related member profiles, the member pagerank score corresponding to a probability that a person accesses the entity-related member profiles; and
determine that the specific entity is a genuine entity based on the member pagerank score.

11. The system of claim 10, the determination module further configured to:
generate an entity profile for the specific entity based on entity information derived from the related member profiles, the entity profile including the actual physical location.

12. The system of claim 10, the determination module further configured to:
create a subgroup of location-related member profiles from the entity-related member profiles, the location-related member profiles being associated with the specific entity and the potential physical location; and
calculate a second connection density value based on connections associated with the location-related member profiles, wherein the determination of the actual physical location is further based on the second connection density value.

13. The system of claim 12, wherein the potential physical location is determined to be an actual physical location when the second connection density meets or exceeds a second pre-determined threshold value.

14. The system of claim 10, the determination module further configured to:
generate a member engagement metric for the entity-related member profiles, the member engagement metric corresponding to an amount of usage of the social network by the entity-related member profiles; and
determine that the specific entity is a genuine entity based on the member engagement metric.

15. The system of claim 10, wherein the pre-determined threshold value is based on an industry associated with the specific entity.

16. The system of claim 10, wherein the pre-determined threshold value is based on a penetration rate for the potential physical location.

17. The system of claim 10, wherein the potential physical location is a zip code, a city, a region, or a country.

18. A non-transitory machine-readable storage medium comprising instructions that, when executed by one or more processors of a machine, cause the machine to perform operations comprising:
accessing, using a network interface device, member profiles from a social network, the member profiles being associated with a plurality of entities, wherein each member profile is associated with a unique user;
creating a subgroup of entity-related member profiles from the accessed member profiles, each of the entity-related member profiles being associated with a specific entity from the plurality of entities;
determining a potential physical location of the specific entity based on location information derived from the entity-related member profiles, the location information indicating a geographic location where users associated with the entity-related member profiles currently reside;
determining an estimated total number of unique users associated with the entity;
determining, based on the estimated total number of unique users, a potential number of unique connections;
calculating, based on entity data describing connections between the entity-related member profiles, an actual number of unique connections between the entity-related member profiles;
dividing the potential number of unique connections by the actual number of unique connection values, yielding a connection density value;
determining that the potential physical location is an actual physical location when the connection density value meets or exceeds a pre-determined threshold connection density value;
calculating a member pagerank score for the entity-related member profiles, the member pagerank score corresponding to a probability that a person accesses the entity-related member profiles; and
determining that the specific entity is a genuine entity based on the member pagerank score.

* * * * *

UNITED STATES PATENT AND TRADEMARK OFFICE
CERTIFICATE OF CORRECTION

PATENT NO. : 10,074,143 B2
APPLICATION NO. : 14/473988
DATED : September 11, 2018
INVENTOR(S) : Wang et al.

Page 1 of 1

It is certified that error appears in the above-identified patent and that said Letters Patent is hereby corrected as shown below:

On the Title Page

In Column 2, under "Foreign Patent Documents", Line 2, delete "WO-201217813 A3" and insert --WO-2012178130 A3-- therefor Signed and Sealed this
Second Day of July, 2019

Andrei Iancu
*Director of the United States Patent and Trademark Office*